OPTICAL SCANNER AND SLIT EXPOSURE DEVICE FOR REPRODUCTION APPARATUS

Original Filed Sept. 6, 1968 2 Sheets-Sheet 1

United States Patent Office

Re. 28,016
Reissued May 21, 1974

28,016

OPTICAL SCANNER AND SLIT EXPOSURE DEVICE FOR REPRODUCTION APPARATUS

Yutaka Koizumi, Tokyo, Japan, assignor to Kabushiki Kaisha Ricoh, Tokyo, Japan

Original No. 3,543,290, dated Nov. 24, 1970, Ser. No. 757,538, Sept. 5, 1968. Application for reissue Apr. 19, 1972, Ser. No. 245,667

Claims priority, application Japan, Sept. 20, 1967, 42/60,356, 42/60,357

Int. Cl. G03b *27/32, 27/70*

U.S. Cl. 355—65 2 Claims

Matter enclosed in heavy brackets [ ] appears in the original patent but forms no part of this reissue specification; matter printed in italics indicates the additions made by reissue.

ABSTRACT OF THE DISCLOSURE

An optical scanning system for use in a document copying apparatus. Photosensitive paper is exposed by the image of an original document. Light from the original document is reflected by two moving mirrors through a fixed lens and is projected through a slit upon photosensitive paper which is moved in a coordination with the movement of the two reflecting mirrors.

The present invention relates to an improvement in a slit exposure device for a reproduction apparatus with an exposure slit.

It is the object of the present invention to provide a compact slit exposure device.

Figure 1:
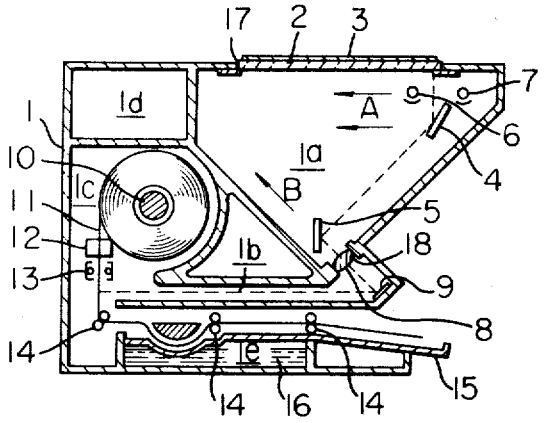
Figure 2:
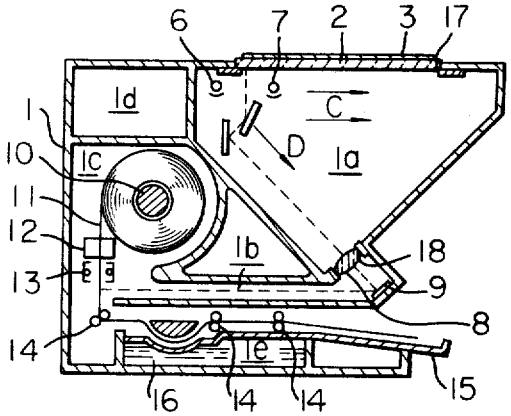
Figure 3:
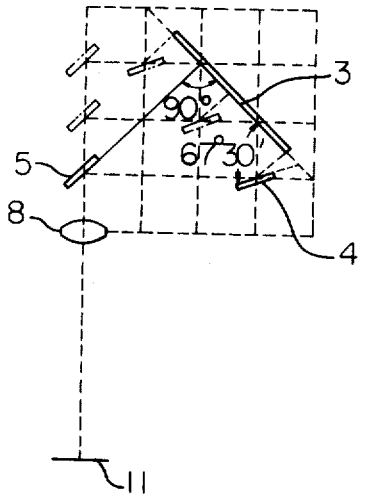
Figure 4:
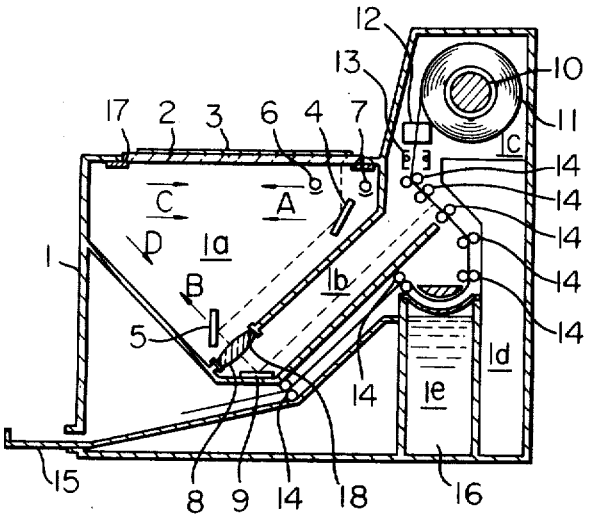

For a better understanding of the invention, reference is made to the following detailed *description* [exposure] of the invention taken in conjunction with the accompanying drawings wherein:

FIG. 1 [denotes] *is* a sectional view of the slit exposure device of the invention, which shows the state of the beginning of exposure;

FIG. 2 [denotes] *is* a sectional view of said device when it has finished the exposure;

FIG. 3 [denotes] *is* a diagram illustrating the principle of the invariance of the optical length in the invention; and FIG. 4 [denotes] *is* a sectional view of another embodiment of the invention.

In the embodiment shown in FIGS. 1 and 2, a glass plate 2 is fixed [on] *at* an upper [hole] *aperture* 17 of [the] *a* housing 1 of the reproduction apparatus, *and the plate 2 serves* as a set stand for an original 3. The inside of the housing is divided into five parts, that is, an illumination part 1a, a slit part 1b, a roller part 1c, an electric control part 1d and a developing part 1e. In the illumination part 1a, there are [equipped] *mounted* a first moving reflection mirror 4, a second moving reflection mirror 5 and *a movable assembly of* illumination light sources 6 and 7 with reflector shades. [in a movable state.] The first moving reflection mirror 4 makes an angle of $\alpha$, for example, 67°30′; with the plane of the original set stand, while the second moving reflection mirror 5 makes an angle of 90° with the above-mentioned plane. The moving reflection mirror 4 and the illumination light source 6 and 7 are movable [in a body] *as a unit (by means of a suitable motor drive obvious to those skilled in the art and requiring no further elaboration hereat) in a* [through a proper motor drive in the] direction parallel to the surface of the original 3, as shown by [an] *arrows* [arrow] A *in FIG. 1*, and in accordance with this motion, the second moving reflection mirror 5 can move in [the direction] *a linear direction at an angle* of $2\alpha$–90°, for example, 45°, with respect to the surface of the original 3 as shown by an arrow B. *The mirror 5 is moved by a suitable motor drive which is not shown in detail but is obvious to those skilled in the art and requires no further elaboration.* There is provided a [transparent] hole 18 at the boundary between the illumination part 1a and the slit part 1b, and a lens 8 is fixed *in hole 18* so that its optical axis [may make] *makes an angle of* $2\alpha$–90°, for example, 45°, with the surface of the original 3. On the inner wall of the slit part 1b there is mounted a fixed reflection mirror 9 *disposed at an angle* perpendicular to the optical axis of the lens *8. In* [On] the roller part 1c, there is *mounted* [provided] a roller *axle* [axis] 10 on which a roll of photosensitive paper 11 may be mounted. The photosensitive paper 11 is drawn out by a *suitable* [proper] drive mechanism in accordance with the motion of the moving reflection mirrors 4 and 5 and the illumination light sources 6 and 7. In the moving path of the photosensitive paper 11, there are provided a cutter 12 for cutting the photosensitive paper, a charger 13 for charging the photosensitive paper by a corona discharge, a guide roller *assembly* 14 and a photosensitive paper receiver 15. In the electric control part *1d* [1a], there are provided (*but not shown*) a power transformer, a motor drive apparatus and other electric *equipment* [equipments], and the developer part 1e is filled with liquid developer 16.

The slit exposure device of the invention is composed of various parts as described above, and the original is placed face down on the glass plate 2. When a switch for the electric control part 1d is turned on, the illumination light sources 6 and 7 [are] [lit up to] illuminate the original and at the same time, the first moving reflection mirror 4 and the illumination light sources 6 and 7 move in [a body] *concert* from the state shown in FIG. 1 in the direction shown by [the] arrow A, and the second moving reflection mirror 5 moves in the direction of [the] arrow B. Meanwhile, the photosensitive paper 11 also moves in *synchronism* [accordance with their motions] *therewith,* is charged [up] negatively by the charger 13 and passes the end plane of the slit part 1b. The light from the original surface is reflected by the moving reflection mirrors 4 and 5, passes through the lens 8, is reflected again by the fixed reflection mirror 9, and [makes] *produces an* image on the sensitive paper 11. In this way, the photosensitive paper is exposed in sequence [through each slit] and when [all] the exposure is [finished] *completed,* the exposure device is in the state shown in FIG. 2 and the photosensitive paper 11 is cut by the cutter 12. The exposed photosensitive paper 11 is *then* guided by the guide roller *assembly* 14, developed by the liquid developer 16 and [is] discharged onto the photosensitive paper receiver 15. Before the the second exposure is started, from the state shown in FIG. 2, the first moving reflection mirror 4 and the illumination light sources 6 and 7 move in the direction of an arrow C while the second moving reflection mirror 5 moves in the direction of an arrow D and the exposure device returns to the initial state shown in FIG. 1.

Here, it should be [noticed] *noted* that when the moving reflection mirrors 4 and 5 move in unison with each other, as shown in FIG. 3, the optical path length from the surface of the original 3 to the lens 8 is constant, the distance between the original surface and the light sources 6 and 7 is also constant, and therefore, the surface of the sensitive paper is always at a focal plane and its luminosity is also invariant.

In the existing reproduction apparatus, there *is* [are] one wherein an original and a photosensitive paper *sheet* are both fixed and they are exposed at one time [just] as in an ordinary enlarger, *another* [one] wherein an original surface is moved in accordance with the movement of a photosensitive paper *sheet* which is exposed through a slit, *another* [one] in which a slit plane is moved in accordance with the movement of a lens, and the like. As [to a] *regards the* system wherein *the* [an] original and [a] *the* photosensitive paper *sheet* are fixed, the *size* [dimension] of the device becomes extremely large and it is quite difficult to illuminate the original uniformly. In *the* [a] system wherein *the* [an] original is moved together with *the* [a] photosensitive paper *sheet* only a part of the original is illuminated through the slit exposure, and the device per se becomes considerably smaller than the system with *the* [a] fixed original and fixed photosensitive paper *sheet* and so *a* high quality [a] lens is not required. However since the original itself should be moved, the operation is rather difficult and some kinds of originals cannot be used. Furthermore, in *the* [a] system wherein *the* [an] original and [*a*] photosensitive paper *sheet* are fixed and a lens and a slit are moved, the size becomes the same [size] as the first one, though it employs a slit exposure system, and its structure *is* [becomes] also complicated, because the movement of the photosensitive paper *sheet* is intermittent.

In the invention, *the* [an] original is kept fixed and a slit exposure is *effected* [conducted] through moving internal reflection mirrors, and the space which the sensitive paper occupies at the exposure position is so small that the device can be made very compact. Moreover, it is not necessary to stop the photosensitive paper, because the invention provides a reproduction apparatus which is simple in structure, easy to handle and high in efficiency. While the present invention has been particularly described in terms of a specific embodiment thereof, it will be understood that in view of the foregoing specification numerous deviations therefrom and modifications thereupon may be readily devised by those skilled in the art without [yet] departing from the present teaching.

What is claimed is:

1. A slit exposure device for a reproduction apparatus which [is characterized in that said device] comprises a first moving reflection mirror making an angle of $\alpha$ with a fixed original surface, a second moving reflection mirror making an angle of 90° with the original surface and a fixed lens [whose] having an optical axis *which* makes $2\alpha$–90° with the original surface, said first moving reflection mirror moving in the direction parallel to the original surface, said second moving reflection mirror moving in the direction of $2\alpha$–90° with *respect to* the original surface in unison with the movement of the first reflection mirror, and the light from the original surface being reflected by the first and the second reflection mirrors, passing through said fixed lens and being projected through a slit upon a photosensitive paper which moves in connection with the movement of the first and the second moving reflection mirrors.

2. A slit exposure device for a reproduction apparatus [which is characterized in that said device comprises] *comprising* a first moving reflection mirror [making] *supported at* an angle of 67°30′ with a fixed original surface, a second moving reflection mirror [making] *supported at* an angle of 90° with the original surface, and a fixed lens [whose] *having an* axis [makes] *at* 45° with the original surface, said first moving reflection mirror [moving] *being movable* in the direction parallel to the original surface, said second moving reflection mirror [moving] *being movable* in the direction of 45° with the original surface in unison with the movement of the first reflection mirror, and the light from the original surface being reflected by the first and the second reflection mirrors, passing through said fixed lens and being projected through a slit upon a photosensitive paper which moves in connection with the movement of the first and the second moving reflection mirrors.

References Cited

The following references, cited by the Examiner, are of record in the patented file of this patent or the original patent.

UNITED STATES PATENTS

| | | | |
|---|---|---|---|
| 3,497,298 | 2/1970 | Watanabe | 355—66 X |
| 3,330,181 | 7/1967 | Jakobson | 355—70 |
| 2,859,673 | 11/1958 | Hix et al. | 355—8 |
| 3,431,053 | 3/1969 | Wick et al. | 355—66 |

OTHER REFERENCES

IBM Technical Disclosure Bulletin, vol. 5, No. 4, September 1962, D. E. Ritter.

JOHN M. HORAN, Primary Examiner

U.S. Cl. X.R.

355—8